(12) United States Patent
Matsumoto et al.

(10) Patent No.: US 8,289,383 B2
(45) Date of Patent: Oct. 16, 2012

(54) MICROSCOPE WITH SUPPORTING UNIT THAT FIXEDLY SUPPORTS THE IMAGING UNIT AND MOVABLY SUPPORTS THE OBJECTIVE LENS

(75) Inventors: Yusuke Matsumoto, Hachioji (JP); Hirofumi Yamamoto, Hino (JP)

(73) Assignee: Olympus Corporation, Tokyo (JP)

( * ) Notice: Subject to any disclaimer, the term of this patent is extended or adjusted under 35 U.S.C. 154(b) by 258 days.

(21) Appl. No.: 12/771,021

(22) Filed: Apr. 30, 2010

(65) Prior Publication Data

US 2010/0277581 A1    Nov. 4, 2010

(30) Foreign Application Priority Data

Apr. 30, 2009  (JP) ................................. 2009-111399
Jun. 25, 2009  (JP) ................................. 2009-151475

(51) Int. Cl.
G02B 21/02   (2006.01)
G02B 21/06   (2006.01)
H04N 7/18    (2006.01)

(52) U.S. Cl. .......... 348/79; 359/380; 359/381; 359/385; 359/386; 359/387; 359/388; 359/389; 359/390; 382/128; 382/276; 348/80

(58) Field of Classification Search .................. 348/79, 348/80; 359/380, 381, 385–390; 382/128, 382/276
See application file for complete search history.

(56) References Cited

U.S. PATENT DOCUMENTS

| 4,210,384 A | 7/1980 | Meyer et al. | |
| 4,855,823 A * | 8/1989 | Struhs et al. | 348/151 |
| 4,901,146 A * | 2/1990 | Struhs et al. | 348/151 |
| 5,266,791 A * | 11/1993 | Morizumi | 250/201.3 |
| 5,276,550 A * | 1/1994 | Kojima | 359/368 |
| RE34,989 E * | 7/1995 | Struhs et al. | 348/151 |
| 5,434,703 A * | 7/1995 | Morizumi | 359/385 |
| 5,668,660 A * | 9/1997 | Hunt | 359/380 |
| 5,689,339 A * | 11/1997 | Ota et al. | 356/401 |
| 6,099,522 A * | 8/2000 | Knopp et al. | 606/10 |
| 6,726,680 B1 * | 4/2004 | Knopp et al. | 606/12 |
| 6,853,454 B1 * | 2/2005 | Heffelfinger | 356/446 |
| 6,913,603 B2 * | 7/2005 | Knopp et al. | 606/10 |
| 6,995,901 B2 * | 2/2006 | Heffelfinger | 359/381 |
| 7,307,784 B2 * | 12/2007 | Kinoshita et al. | 359/368 |

(Continued)

FOREIGN PATENT DOCUMENTS

JP    2004-348089    12/2004

(Continued)

OTHER PUBLICATIONS

Partial European Search Report dated Aug. 5, 2010, pp. 1-5.

*Primary Examiner* — Haresh N Patel
(74) *Attorney, Agent, or Firm* — Scully, Scott, Murphy & Presser, P.C.

(57) ABSTRACT

A microscope, which moves an objective lens along an observation optical axis with respect to a specimen, includes an imaging unit and a supporting unit. The imaging unit has an imaging lens, which is arranged on the observation optical axis and forms an observation image of the specimen, and an imaging element, which is arranged on the observation optical axis and takes the observation image, and is optically connected to the objective lens by a parallel light flux. The supporting unit fixedly supports the imaging unit, and movably supports the objective lens.

9 Claims, 11 Drawing Sheets

U.S. PATENT DOCUMENTS

| | | | |
|---|---|---|---|
| 2002/0173778 A1* | 11/2002 | Knopp et al. | 606/5 |
| 2002/0198516 A1* | 12/2002 | Knopp et al. | 606/5 |
| 2004/0059321 A1* | 3/2004 | Knopp et al. | 606/10 |
| 2005/0157299 A1* | 7/2005 | Heffelfinger | 356/417 |
| 2005/0157385 A1* | 7/2005 | Heffelfinger | 359/385 |
| 2005/0219687 A1* | 10/2005 | Aono et al. | 359/385 |
| 2008/0225278 A1* | 9/2008 | Namba et al. | 356/123 |
| 2008/0247038 A1* | 10/2008 | Sasaki et al. | 359/395 |
| 2009/0086314 A1* | 4/2009 | Namba et al. | 359/383 |

FOREIGN PATENT DOCUMENTS

| | | |
|---|---|---|
| JP | 2006-337471 | 12/2006 |

\* cited by examiner

MICROSCOPE WITH SUPPORTING UNIT THAT FIXEDLY SUPPORTS THE IMAGING UNIT AND MOVABLY SUPPORTS THE OBJECTIVE LENS

CROSS-REFERENCE TO RELATED APPLICATIONS

This application is based upon and claims the benefit of priority from Japanese Patent Application No. 2009-111399, filed on Apr. 30, 2009 and Japanese Patent Application No. 2009-151475, filed on Jun. 25, 2009, the entire contents of which are incorporated herein by reference.

BACKGROUND OF THE INVENTION

1. Field of the Invention

The present invention relates to a microscope that moves an objective lens along an observation optical axis with respect to a specimen.

2. Description of the Related Art

Conventionally, there is a microscope that makes an observation of a specimen by moving an objective lens along an observation optical axis with respect to the specimen and displaying an observation image on a liquid-crystal monitor or the like. For example, a microscope that makes an observation of a specimen by moving an objective lens and a camera together as a unit is disclosed in Japanese Laid-open Patent Publication No. 2004-348089 and Japanese Laid-open Patent Publication No. 2006-337471.

SUMMARY OF THE INVENTION

A microscope according to an aspect of the present invention includes an objective lens; an imaging unit that has an imaging lens for forming an observation image of a specimen and an imaging element for taking the observation image, the imaging lens and the imaging element being arranged on an observation optical axis, and the imaging unit being optically connected to the objective lens by a parallel light flux; and a supporting unit that fixedly supports the imaging unit, and movably supports the objective lens.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments.

Figure 1:
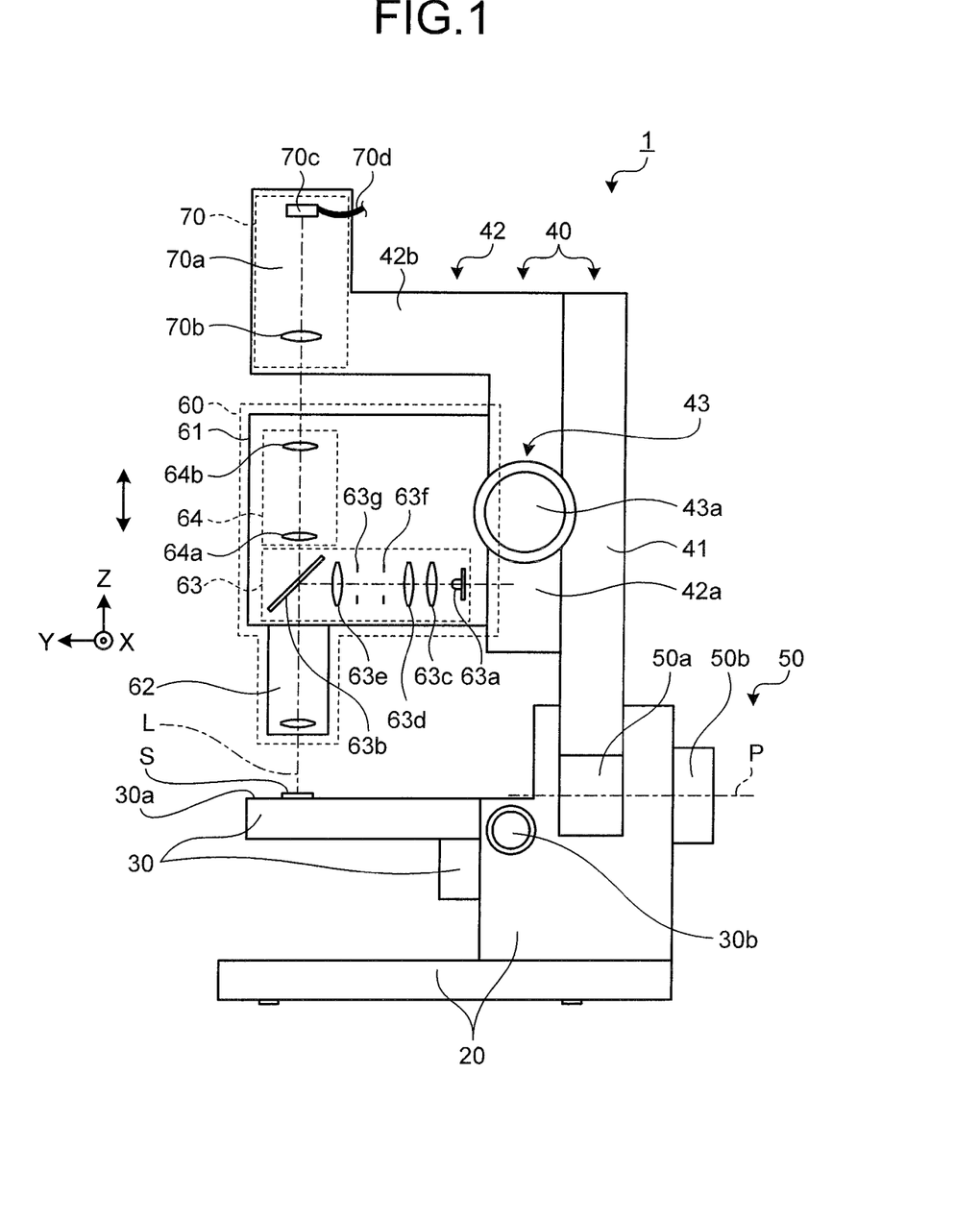
FIG. 1 is a side view illustrating a configuration of a microscope according to a first embodiment of the present invention.

FIG. 1 is a side view illustrating a configuration of a microscope 1 according to a first embodiment of the present invention. As shown in FIG. 1, the microscope 1 has a base unit 20, a stage 30, a supporting unit 40, a rotary holding unit 50, a focusing unit 60, and an imaging unit 70.

The base unit 20 is a mount part supporting the entire microscope 1. The stage 30 is supported by the base unit 20, and has a specimen table 30a on a top surface thereof. The specimen table 30a is a table on which a specimen S is put. The stage 30 is connected to a stage handle 30b by a moving mechanism (not shown), and makes a rotational movement in an X-Y direction shown the drawing and around an observation optical axis L by the turning operation of the stage handle 30b.

The supporting unit 40 has a strut unit 41, an L-shaped supporting unit 42, and a focusing-unit moving mechanism 43. The strut unit 41 is a right prism-like strut, and is rotatably held by the base unit 20 via the rotary holding unit 50 so that the strut unit 41 can rotate around a horizontal axis line P. Furthermore, the strut unit 41 is held by the base unit 20 so that a side surface of which is parallel to a direction of the observation optical axis L. The L-shaped supporting unit 42 is a member that a right prism is bent into an L shape, and has a body portion 42a joined to the strut unit 41 along the side surface of the strut unit 41 and an arm portion 42b extending from the upper part of the body portion 42a in a horizontal direction. The L-shaped supporting unit 42 is joined to the strut unit 41 so that the body portion 42a is along the side surface of the strut unit 41.

The focusing-unit moving mechanism 43 has a focus handle 43a and a lift mechanism with a pinion and a rack (not shown) to which the focus handle 43a is connected. By the operation of the focus handle 43a, the focusing-unit moving mechanism 43 can move an enclosure 61 to be described below along the body portion 42a. In other words, the focusing-unit moving mechanism 43 can move the enclosure 61 in a direction parallel to the observation optical axis L. The focusing-unit moving mechanism 43 having the lift mechanism with the pinion and the rack is described as an example; however, the configuration of the focusing-unit moving mechanism 43 is not limited to this, and any other configuration can be employed as long as the focusing-unit moving mechanism 43 can move the enclosure 61 in the direction parallel to the observation optical axis L. For example, the focusing-unit moving mechanism 43 can have a lift mechanism with a ball screw.

The rotary holding unit 50 has a rotating mechanism 50a and a strut fixing knob 50b. The strut fixing knob 50b is connected to the rotating mechanism 50a, for example, via a screw unit (not shown), and fixes the strut unit 41 at a desired rotational position around the horizontal axis line P. Specifically, the rotary holding unit 50 fixes the strut unit 41 at the desired rotational position with the strut unit 41 pressed against the base unit 20 by tightening up the strut fixing knob 50b, and turns the supporting unit 40 by loosening the strut fixing knob 50b. Namely, the rotary holding unit 50 holds a lower end of the supporting unit 40 or near the lower end so that the supporting unit 40 can turn.

The focusing unit 60 has the enclosure 61 formed into a box, an objective lens 62, an epi-illumination projecting unit 63, and a magnification converting unit 64. The enclosure 61 is movably supported by the body portion 42a via the focusing-unit moving mechanism 43 so that the enclosure 61 can move in the direction parallel to the observation optical axis L.

The objective lens 62 is attached to the lower part of the enclosure 61, and moves with respect to the specimen S along the observation optical axis L with movement of the enclosure 61.

The epi-illumination projecting unit 63 is provided in the enclosure 61, and lets illumination light fall on the objective lens 62. The epi-illumination projecting unit 63 has a light source 63a, an optical-path splitting element 63b, condenser lenses 63c, 63d, and 63e, an aperture stop 63f, and a field stop 63g.

The light source 63a emits illumination light in a range of wavelengths from a visible region to an ultraviolet region with a white LED or the like. As the optical-path splitting element 63b, a half mirror, a dichroic mirror, or the like is used. The optical-path splitting element 63b is arranged on the observation optical axis L between the magnification converting unit 64 and the objective lens 62, reflects the illumination light emitted from the light source 63a to the side of the objective lens 62, and lets the observation light reflected from the specimen S therethrough.

The condenser lenses 63c, 63d, and 63e are arranged between the light source 63a and the optical-path splitting element 63b. The condenser lens 63c concentrates the illumination light emitted from the light source 63a into a parallel light. The condenser lens 63d focuses the illumination light concentrated into the parallel light by the condenser lens 63c into a first light source image at the position of the aperture stop 63f. The condenser lens 63e focuses the illumination light entering via the field stop 63g from the first light source image into a second light source image at the back focal position of the objective lens 62 on a reflection optical path of the optical-path splitting element 63b. The configuration of the epi-illumination projecting unit 63 is not limited to that is described above; any other configuration can be employed as long as the epi-illumination projecting unit 63 lets illumination light fall on the objective lens 62 so that the specimen S is irradiated with parallel light via the objective lens 62.

The magnification converting unit 64 is provided in the enclosure 61, and has two zoom lenses 64a and 64b arranged on the observation optical axis L. The magnification converting unit 64 moves any of the zoom lenses 64a and 64b along the observation optical axis L, thereby changing the observation magnification. The magnification converting unit 64 having two zoom lenses is described as an example; however, the configuration of the magnification converting unit 64 is not limited to this, and any other configuration can be employed as long as the magnification converting unit 64 has at least two zoom lenses and can convert the observation magnification.

The imaging unit 70 is fixed to the arm portion 42b, and supported by the arm portion 42b. The imaging unit 70 has a tube 70a, an imaging lens 70b, and an imaging element 70c. The imaging lens 70b is arranged on the observation optical axis L in the tube 70a, and focuses a parallel light flux from the side of the objective lens 62 into an observation image of the specimen S. As the imaging element 70c, a CCD camera or the like is used. The imaging element 70c is arranged on the observation optical axis L in the tube 70a. The imaging element 70c takes the observation image of the specimen S imaged by the imaging lens 70b, and outputs the observation image of the specimen S to a display unit (not shown), such as a liquid-crystal monitor, provided to the outside via a cable 70d or the like so that the observation image of the specimen S is displayed on the display unit. In this manner, the imaging lens 70b and the imaging element 70c are arranged on the observation optical axis L, whereby the imaging unit 70 is optically connected to the objective lens 62 by the parallel light flux.

In this microscope 1, the illumination light emitted from the light source 63a is concentrated into parallel light by the condenser lens 63c, and focused into a first light source image at the position of the aperture stop 63f by the condenser lens 63d. After that, the illumination light enters the condenser lens 63e via the field stop 63g, and is reflected to the side of the objective lens 62 by the optical-path splitting element 63b, and then falls on the objective lens 62 along the observation optical axis L. After that, the illumination light is focused into a second light source image at the back focal position of the objective lens 62, and after the illumination light is concentrated into approximately-parallel light by passing through the objective lens 62, the specimen S is irradiated with the illumination light. The reflected light from the specimen S passes, as observation light, through the objective lens 62 and the optical-path splitting element 63b, and enters the imaging lens 70b via the zoom lenses 64a and 64b. Then, an observation image of the specimen S is focused on the imaging element 70c by the imaging lens 70b.

Figure 2A:
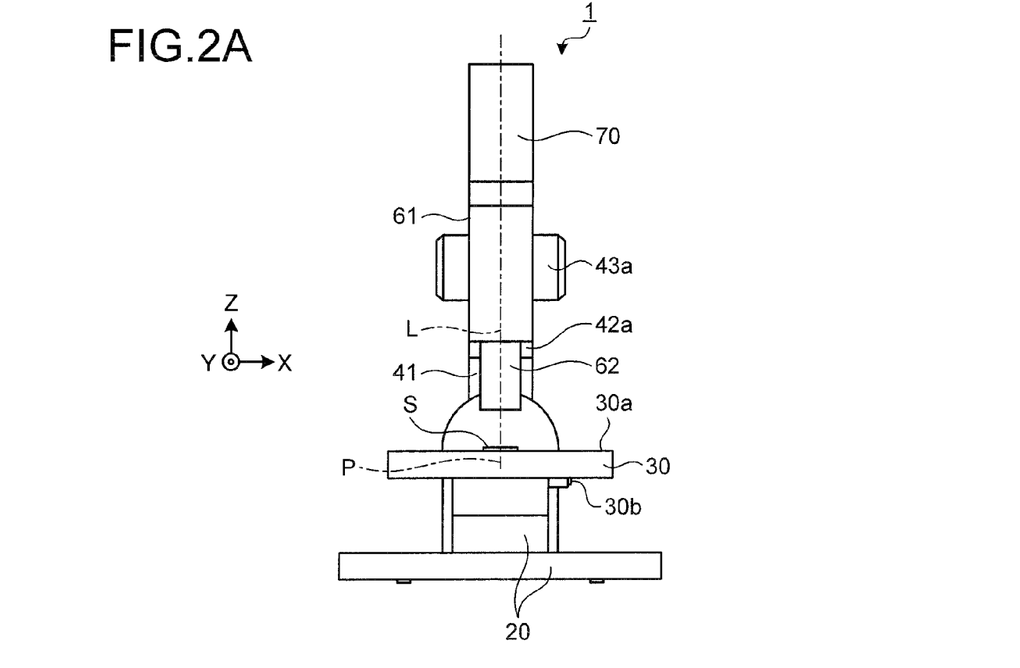
FIG. 2A is a diagram illustrating a state where a supporting unit shown in FIG. 1 stands in an upright position.
Figure 2B:
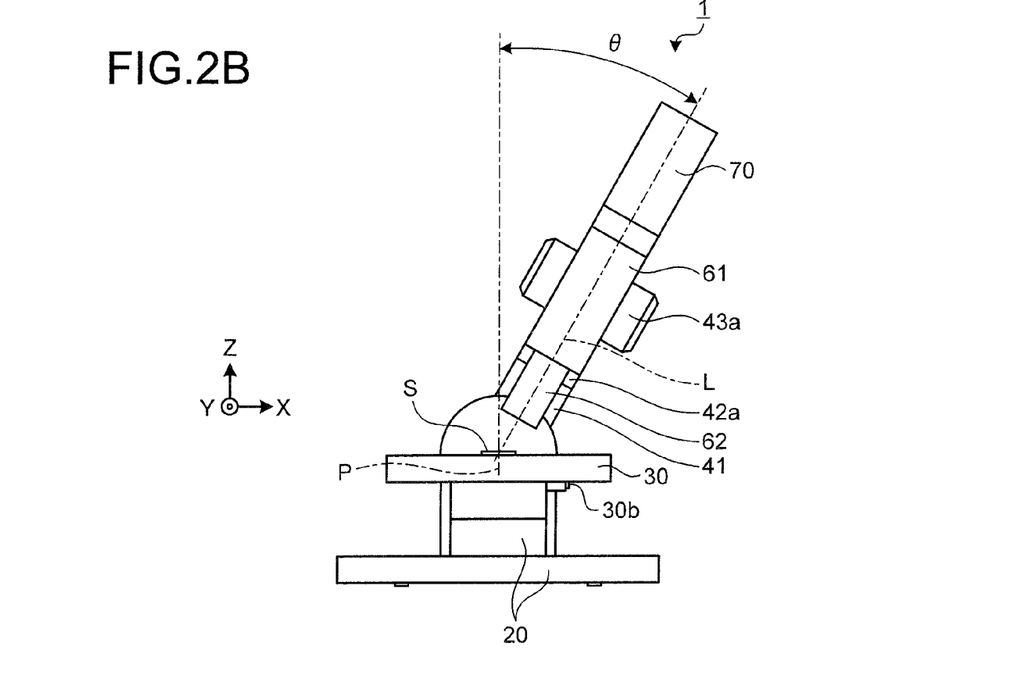
FIG. 2B is a diagram illustrating a state where the supporting unit shown in FIG. 1 is tilted around a horizontal axis line.

Subsequently, how to operate the microscope 1 according to the first embodiment is explained. First, an operator loosens the strut fixing knob 50b, and turns the supporting unit 40 to a desired position. After that, the operator fixes the supporting unit 40 by tightening up the strut fixing knob 50b. As a result, the supporting unit 40 is fixed in an upright state (FIG. 2A) or a tilted state in which the supporting unit 40 is tilted at a desired angle θ around the horizontal axis line P (FIG. 2B). After that, the operator puts a specimen S on the specimen table 30a, and moves the specimen S by turning the stage handle 30b to make a rough position (focus) adjustment of the objective lens 62 with respect to the specimen S.

After that, the operator moves the enclosure 61 by turning the focus handle 43a. Namely, the operator focuses the microscope 1 on the specimen S by moving the objective lens 62 along the observation optical axis L. At this time, in a state where the imaging unit 70 is fixed to the arm portion 42b, the objective lens 62 is moved. Furthermore, since the epi-illumination projecting unit 63 is provided in the enclosure 61, the epi-illumination projecting unit 63 moves together with the movement of the objective lens 62 along the observation optical axis L.

In the microscope 1 according to the first embodiment, the supporting unit 40 fixedly supports the imaging unit 70 and movably supports the objective lens 62, so the focusing unit 60 including the objective lens 62 can be moved for focusing with the imaging unit 70 fixed. At this time, although a positional relation between the imaging unit 70 and the objective lens 62 varies, the imaging unit 70 is optically connected to the objective lens 62 by a parallel light flux, so there is no optical impact. Consequently, the weight balance of the microscope 1 at the time of movement of the objective lens 62 is stabilized as compared with a case where the objective lens 62 and the imaging unit 70 are moved together as a unit. Furthermore, even when the objective lens 62 is moved along the observation optical axis L in a state where the supporting unit 40 is tilted at the angle θ as shown in FIG. 2B, there is little change in the position of the gravity center of the microscope 1, so the weight balance of the microscope 1 is stabilized. Consequently, there is no need to employ a device configuration tolerant of a change in weight balance as in the case where the objective lens 62 and the imaging unit 70 are moved together as a unit, and thus it is possible to construct a microscope apparatus in a simple configuration.

Moreover, in the microscope 1 according to the first embodiment, the epi-illumination projecting unit 63 moves together with the movement of the objective lens 62 along the observation optical axis L, so even when the objective lens 62 is moved, a light source image can be focused at the back focal position of the objective lens 62. Consequently, it is possible to provide an optimum illumination with respect to the specimen S.

Figure 3:
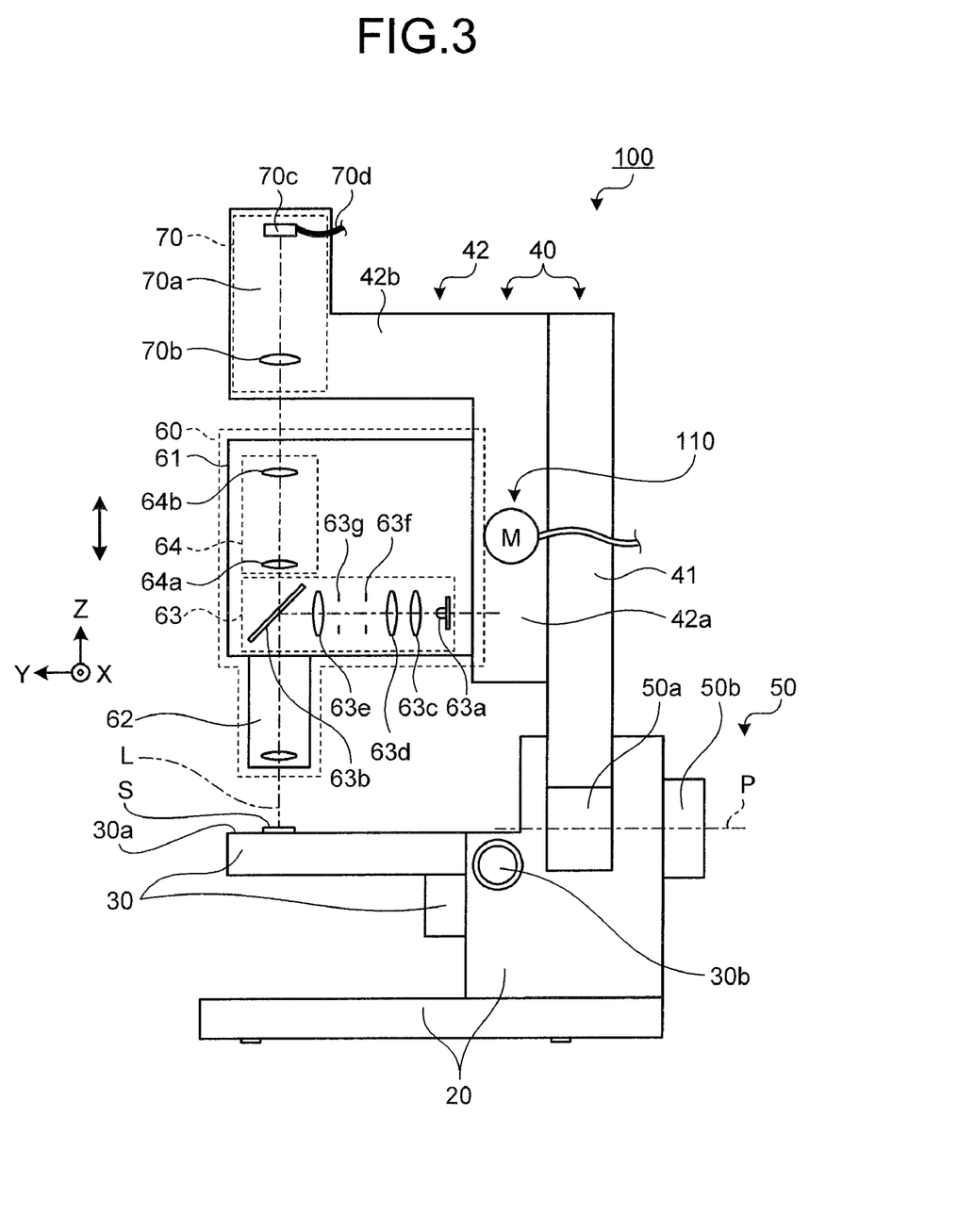
FIG. 3 is a side view of a microscope according to a first variation of the microscope shown in FIG. 1.

Subsequently, a first variation of the microscope 1 according to the first embodiment is explained. FIG. 3 is a side view of a microscope 100 according to the first variation of the microscope 1 shown in FIG. 1. In this first variation, a focusing mechanism 110 of the microscope 100 has a motor M for generating power for movement of the enclosure 61. The microscope 100 moves the enclosure 61 by driving the motor M. For example, a rotation axis is connected to the rotation center of a pinion of the focusing mechanism 110, and the connected rotation axis is rotated by the motor M. Consequently, the operator does not have to perform the focus operation by rotating the focus handle 43a, and thus the burden on the operator can be reduced.

Figure 4:
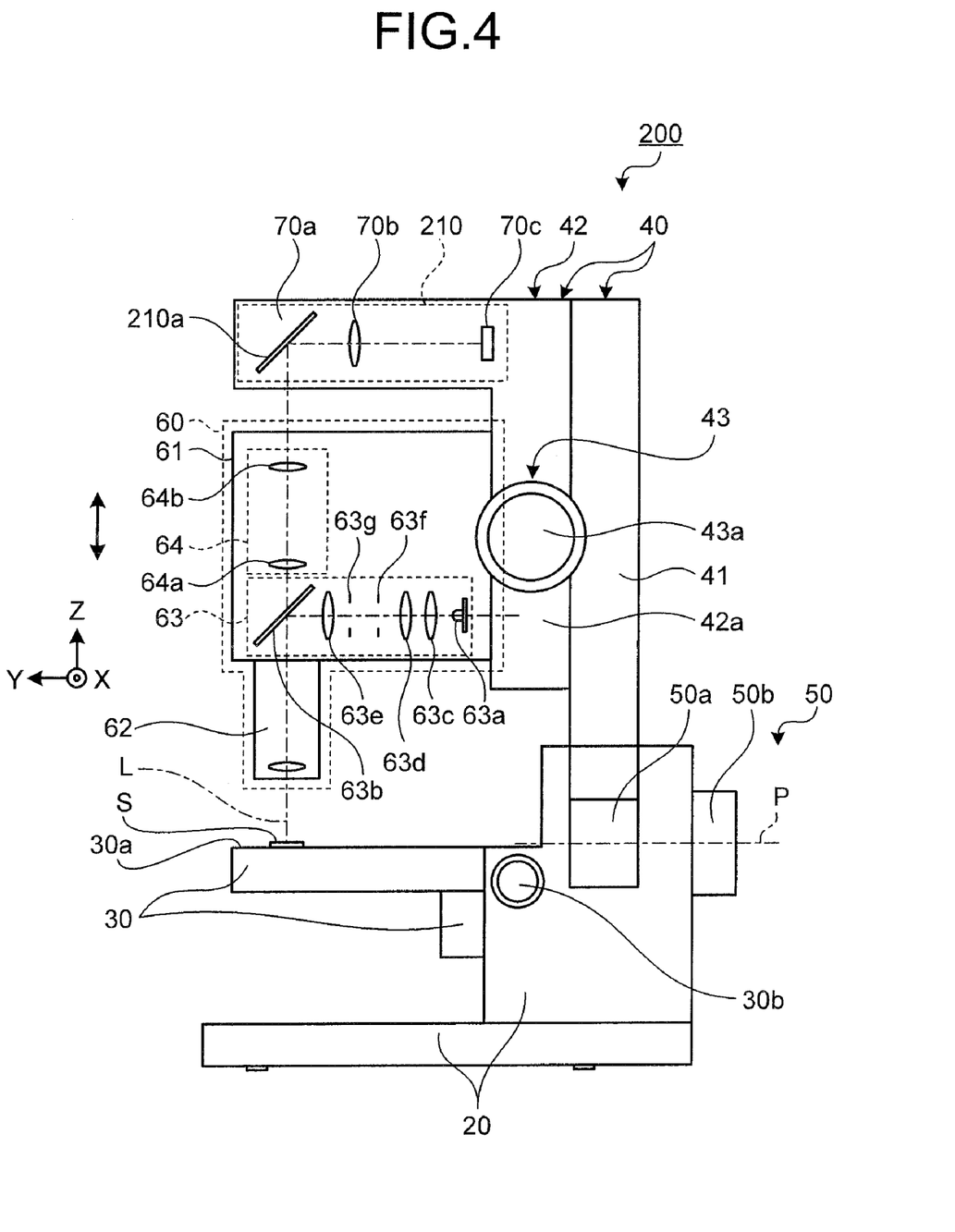
FIG. 4 is a side view of a microscope according to a second variation of the microscope shown in FIG. 1.

Subsequently, a second variation of the microscope 1 according to the first embodiment is explained. FIG. 4 is a side view of a microscope 200 according to the second variation of the microscope 1 shown in FIG. 1. In this second variation, an imaging unit 210 of the microscope 200 has an optical-path changing element 210a, such as a total reflection mirror, which changes an optical path of an observation light entering the imaging lens 70b in the horizontal direction. The imaging lens 70b and the imaging element 70c are arranged on an observation optical axis of the observation light of which the optical path is changed in the horizontal direction by the optical-path changing element 210a. Consequently, the height of the microscope can be reduced, and the gravity center can be kept low; thus, the weight balance at the time of movement of the objective lens 62 is further stabilized.

Figure 5:
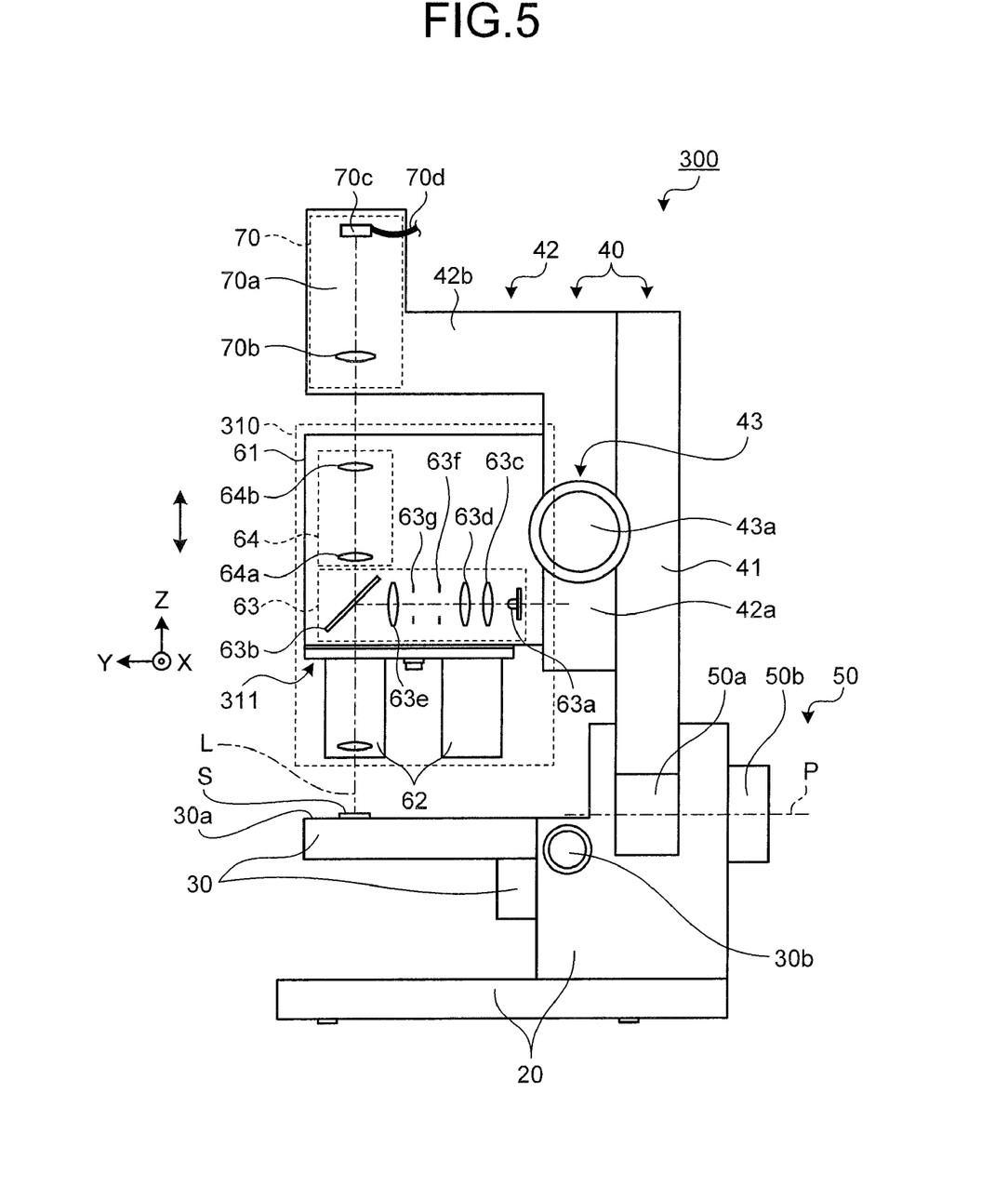
FIG. 5 is a side view of a microscope according to a third variation of the microscope shown in FIG. 1.

Subsequently, a third variation of the microscope 1 according to the first embodiment is explained. FIG. 5 is a side view of a microscope 300 according to the third variation of the microscope 1 shown in FIG. 1. In this third variation, a focusing unit 310 of the microscope 300 has a revolving nosepiece 311. The revolving nosepiece 311 holds a plurality of objective lenses 62, and sets desired one of the plurality of objective lenses 62 on the observation optical axis L. In this manner, the revolving nosepiece 311 can be added to the focusing unit 310 because the weight balance at the time of movement of the objective lens 62 is stabilized as the objective lens 62 can be moved for focusing with the imaging unit 70 fixed. This makes it possible to easily switch among the objective lenses 62 of different magnifications from one another and set one of them on the observation optical axis L.

Figure 6:
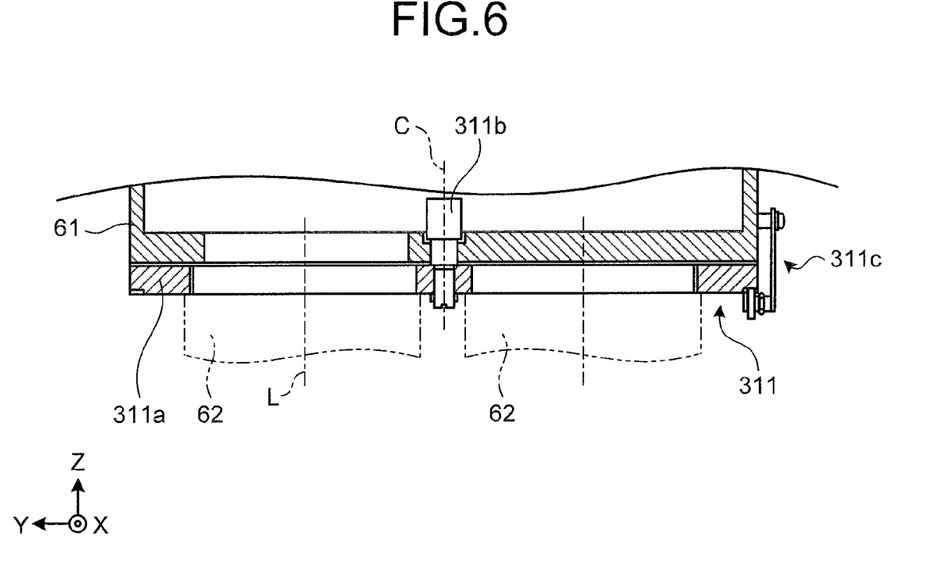
FIG. 6 is an enlarged view of a main portion of a revolving nosepiece shown in FIG. 5.

FIG. 6 is an enlarged view of a main portion of the revolving nosepiece 311 shown in FIG. 5. The revolving nosepiece 311 has a rotary member 311a, a rotation axis portion 311b, and a click mechanism 311c. The rotary member 311a removably holds the plurality of objective lenses 62. The rotation axis portion 311b rotatably holds the rotary member 311a so that the rotary member 311a can rotate around a rotation axis line C. The click mechanism 311c assists in positioning and arranging the desired objective lens 62 out of the objective lenses 62 held by the rotary member 311a on the observation optical axis L. The revolving nosepiece 311 sets the desired objective lens 62 on the observation optical axis L by rotating the rotary member 311a and positioning the click mechanism 311c. The configuration of the revolving nosepiece 311 is not limited to that is shown in FIG. 5, and any other configuration can be employed as long as the revolving nosepiece 311 can hold a plurality of objective lenses 62 and set desired one of the plurality of objective lenses 62 on the observation optical axis L. It is preferable that a lightweight revolving nosepiece be used as the revolving nosepiece 311.

In the first embodiment, it is described that the epi-illumination projecting unit 63 and the magnification converting unit 64 are provided in the enclosure 61, and the enclosure 61 is movably supported by the supporting unit 40; however, the present invention is not limited to this configuration, and any other configuration can be employed as long as the imaging unit 70 is fixedly supported by the supporting unit 40 and the objective lens 62 is movably supported by the supporting unit 40. For example, out of the epi-illumination projecting unit 63 and the magnification converting unit 64, only the epi-illumination projecting unit 63 can be provided in the enclosure 61.

Furthermore, in the first embodiment, it is described that the strut unit 41 is a right prism-like strut, and the L-shaped supporting unit 42 is a member that a right prism is bent into an L shape; the shapes of the strut unit 41 and the L-shaped supporting unit 42 are not limited thereto, and the strut unit 41 and the L-shaped supporting unit 42 can have any other shapes as long as the imaging unit 70 is fixedly supported on the observation optical axis L by the supporting unit 40 and the enclosure 61 is movably supported by the supporting unit 40 via the focusing-unit moving mechanism 43 so that the enclosure 61 can move in the direction parallel to the observation optical axis L, i.e., as long as the imaging unit 70 is fixedly supported on the observation optical axis L by the supporting unit 40 and the objective lens 62 is movably supported by the supporting unit 40 so that the objective lens 62 can move along the observation optical axis L.

Moreover, in the first embodiment, it is described that the supporting unit 40 is rotatably held by the base unit 20 via the rotary holding unit 50 so that the supporting unit 40 can rotate around the horizontal axis line P; however, the present invention is not limited to this configuration, and the supporting unit 40 can be fixed to the base unit 20 in an upright state with the supporting unit 40 prevented from rotating.

Second to fourth embodiments of the microscope according to the present invention are explained in detail below with reference to the drawings. In what follows, the X-axis direction in the drawings denotes a horizontal direction of the microscope, the Y-axis direction in the drawings denotes a front-back direction of the microscope, and the Z-axis direction in the drawings denotes a vertical direction of the microscope.

Figure 7:
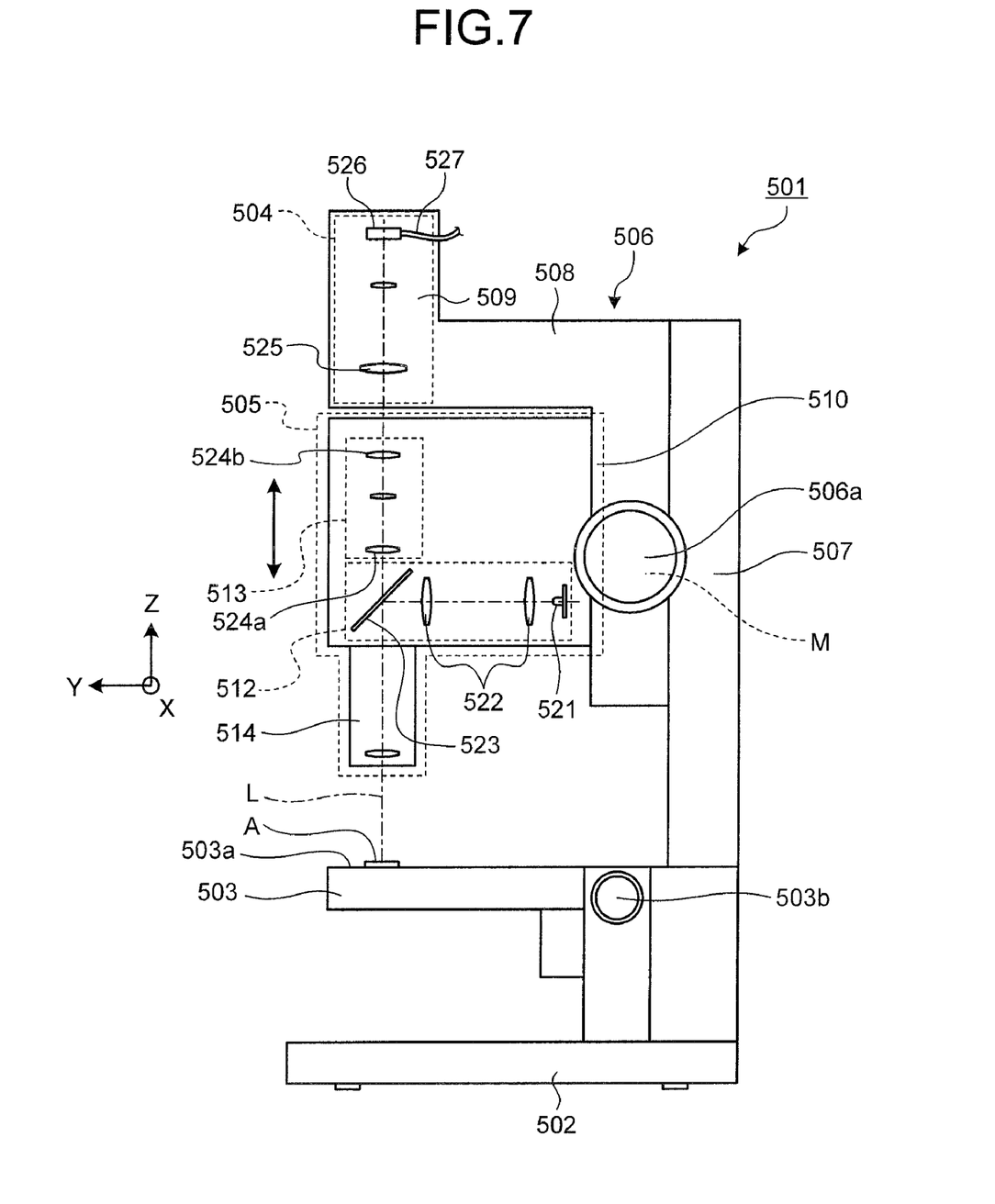
FIG. 7 is a side view illustrating a configuration of a microscope according to a second embodiment of the present invention.
Figure 8:
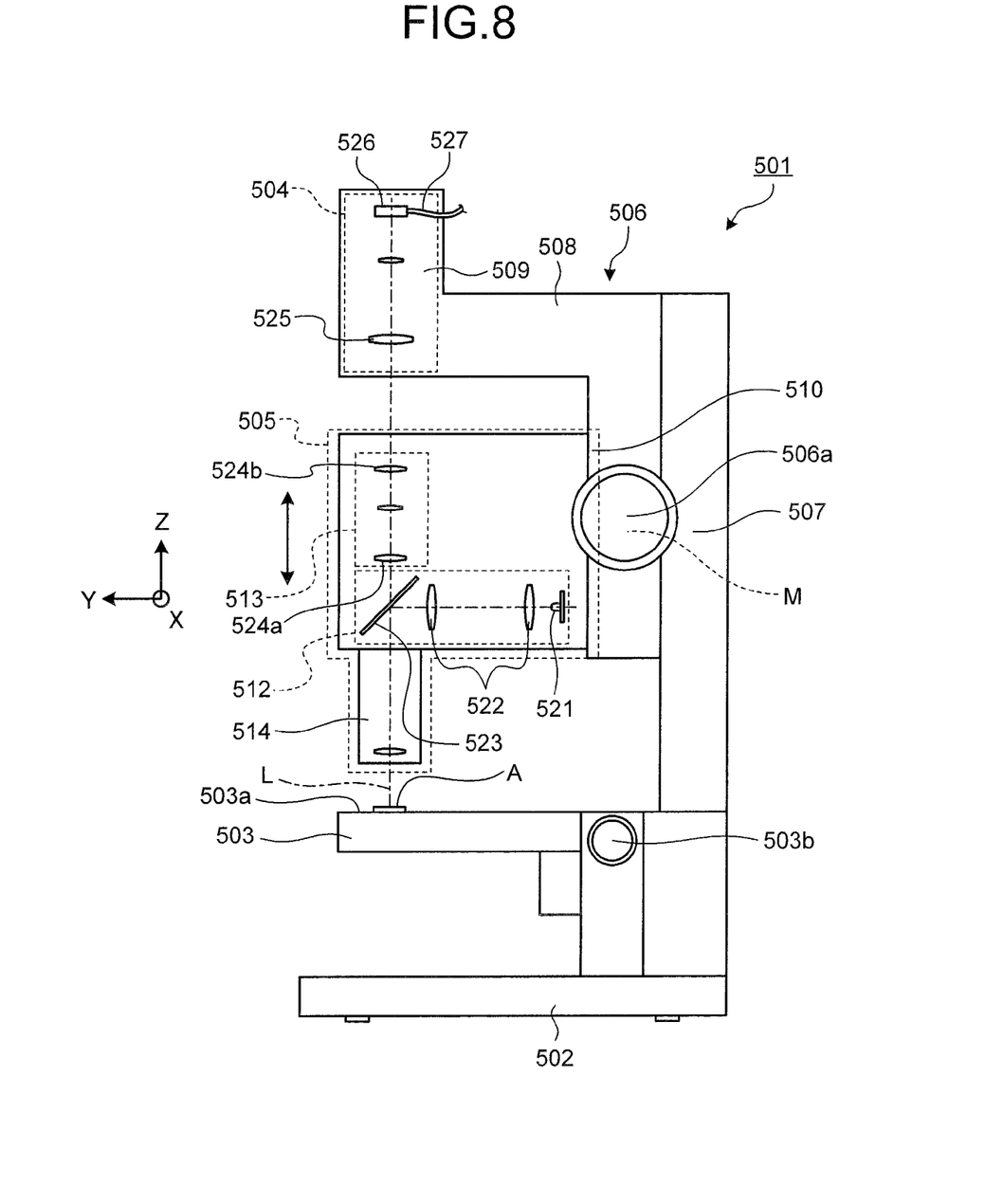
FIG. 8 is a side view illustrating a case where a focusing unit of the microscope according to the second embodiment is moved on the lower side.

FIGS. 7 and 8 show a microscope according to the second embodiment of the present invention. FIG. 7 shows the microscope in a state where a focusing unit is located on the upper side, and FIG. 8 shows the microscope in a state where the focusing unit is moved on the lower side. A microscope 501 has a base unit 502, a stage 503, and a strut 507. The base unit 502 is a part directly placed in a location on which the microscope 501 is put, such as on the desk, and is mounting for supporting the entire microscope 501.

The stage 503 is mounted on top of the base unit 502, and includes a specimen putting surface 503a on the top face thereof. On the specimen putting surface 503a, a specimen A, an object to be observed, is put. The stage 503 can move in directions of the back and forth and the right and left of the microscope 501 and rotate around the observation optical axis L by the operation of a stage handle 503b mounted on the base unit 502.

The strut 507 is provided on the back side face of the stage 503 on top of the base unit 502 in a standing manner. On the front face of the strut 507, a focusing support unit 506 is mounted. On the front face of the focusing support unit 506, a focusing unit 505 is movably mounted so that the focusing unit 505 can move up and down via a focusing-unit moving mechanism 510 with respect to the focusing support unit 506. The focusing-unit moving mechanism 510 is a mechanism for moving the focusing unit 505 with respect to the focusing support unit 506, and is a publicly-known mechanism, such as a mechanism with a rack and a pinion or a mechanism with a ball screw. In the focusing support unit 506, a focus handle 506a for moving the focusing unit 505 is mounted. The focusing-unit moving mechanism 510 can be driven by an electric motor M. On the upper side of the focusing support unit 506, an arm 508 is formed to extend from the back face side to the front face side of the microscope 501 so as to project upward above the focusing unit 505. At a leading end of the arm 508 in a direction of projection, a tube 509 formed into a cylinder extending in the vertical direction is mounted. In the tube 509, an observing unit 504 is provided.

The focusing unit 505 has an illuminating unit 512, a magnification converting unit 513, and an objective lens 514. The objective lens 514 is provided so as to project downward from the focusing unit 505. The illuminating unit 512 has an illumination light source 521, illumination lenses 522, and an optical-path splitting element 523. The illumination light source 521 is composed of a white LED, and mounted around the observation optical axis L toward the observation optical axis L. The illumination light source 521 is supplied with power from a power supply (not shown) housed in the focusing unit 505. The optical-path splitting element 523 is composed of a half mirror, and arranged on the observation optical axis L. The optical-path splitting element 523 reflects light from the illumination light source 521 to the side of the specimen A, and lets the reflected light from the specimen therethrough. The illumination lenses 522 are mounted between the illumination light source 521 and the optical-path splitting element 523.

The magnification converting unit 513 includes at least two zoom lenses 524a and 524b. The zoom lenses 524a and 524b are connected to a motor (not shown), and can be moved along the observation optical axis L by the motor. The observation magnification is changed by movement of the zoom lenses 524a and 524b.

The observing unit 504 has an imaging lens 525 and an imaging element 526. The imaging element 526 is composed of a CCD. The imaging element 526 is connected to a cable 527, and an observation image is displayed on a monitor (not shown). The observing unit 504 and the focusing unit 505 are optically connected by a parallel light flux. Namely, the reflected light from the specimen A is concentrated into a parallel light flux when the reflected light exits from the focusing unit 505, and the parallel light flux enters the imaging lens 525 of the observing unit 504. The focusing unit 505 is moved along the observation optical axis L by the focusing-unit moving mechanism 510. The focusing unit 505 is moved independently of the observing unit 504.

On the observation optical axis L, in order from bottom to top, the specimen A, the objective lens 514, the optical-path splitting element 523, the zoom lenses 524a and 524b, the imaging lens 525, and the imaging element 526 are arranged. The illumination light emitted from the illumination light source 521 is reflected by the optical-path splitting element 523, and turned toward the specimen A, and then falls on the specimen A along the observation optical axis L. After that, the illumination light passes through the objective lens 514, and is focused and irradiated to the specimen A. The reflected light from the specimen A passes through the objective lens 514 and the optical-path splitting element 523, and enters the imaging lens 525 via the zoom lenses 524a and 524b. Then, the reflected light is focused into an image on the imaging element 526 by the imaging lens 525.

The focusing operation of the microscope 501 is explained. A specimen A is put on the stage 503, and a rough focus adjustment is performed by turning the stage handle 503b. A fine focus adjustment is performed by turning the focus handle 506a to move the focusing unit 505 along the observation optical axis L with respect to the focusing support unit 506 as shown in FIGS. 7 and 8. Namely, the focusing unit 505 is moved up and down along the observation optical axis L to adjust so that a focal plane (a front focal position) of the objective lens 514 is located on the specimen A. Furthermore, the magnification (the observation magnification) of an observation optical system can be changed by moving the zoom lenses 524a and 524b of the magnification converting unit 513 along the observation optical axis L by driving a motor (not shown).

Since the microscope 501 configured as described above achieves an epi-illumination of the same axis as the observation optical axis L even when the focusing unit 505 is moved for focusing in a direction away from the specimen A, the reflected light from the specimen A reliably enters the objective lens 514. Namely, a decrease in amount of the reflected light from the specimen A is prevented, and it is possible to observe the specimen properly. Furthermore, in the microscope 501, since the focusing unit 505 is moved for focusing independently of the observing unit 504, a capability required for the focusing operation can be reduced as compared with a microscope in which a focusing unit and an observing unit move for focusing together as a unit, and thus the burden of the focusing operation on an operator can be reduced. If the focusing unit 505 is moved by an electric motor M, the burden of the focusing operation on the operator can be further reduced, and the operability is improved.

Figure 9:
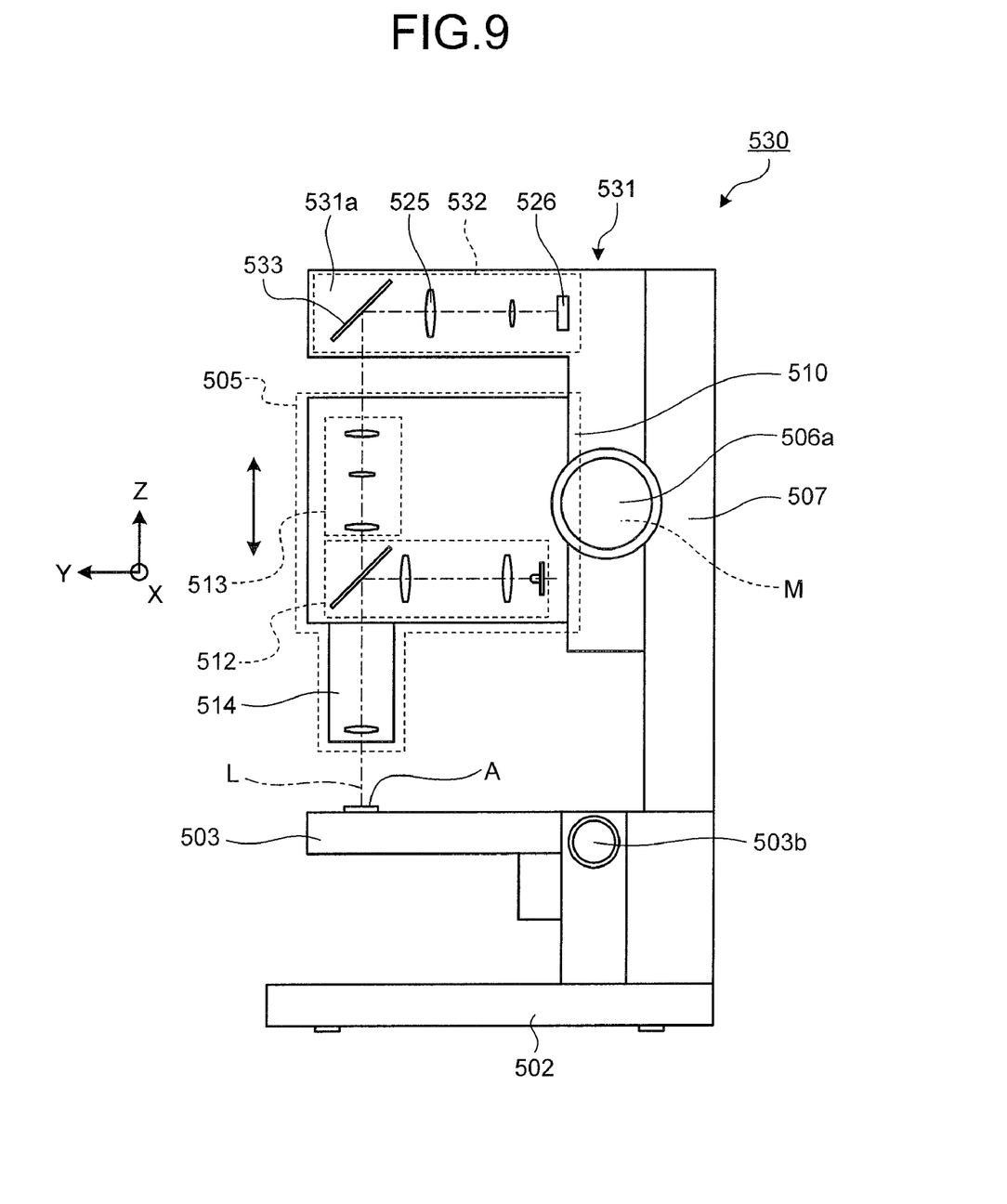
FIG. 9 is a side view illustrating a configuration of a microscope according to a third embodiment of the present invention.

FIG. 9 is a side view illustrating a microscope according to the third embodiment of the present invention. In what follows, portions identical to those explained in the second embodiment are denoted by the same reference numerals, and the description of the portions is omitted.

A focusing support unit 531 included in a microscope 530 according to the third embodiment is, in the same manner as the focusing support unit 506 in the second embodiment, mounted on the front face of the strut 507. The focusing unit 505 is movably mounted on the front face of the focusing support unit 531 via the focusing-unit moving mechanism 510 so that the focusing unit 505 can move up and down with respect to the focusing support unit 531. On the upper side of the focusing support unit 531, an arm 531a is formed to extend from the back face side to the front face side of the microscope 530 so as to project upward above the focusing unit 505.

In the microscope 530 according to the third embodiment, an observing unit 532 is included in the arm 531a. The observing unit 532 has an optical-path changing element 533, the imaging lens 525, and the imaging element 526. The optical-path changing element 533 changes an optical path of a parallel light flux, and is provided on the side of a leading end of the arm 531a in a direction of projection. The optical-path changing element 533 is a folding mirror. The imaging lens 525 is mounted on the back face side of the microscope 530 than the optical-path changing element 533, and the imaging element 526 is mounted on the back face side of the microscope 530 than the imaging lens 525.

The optical-path changing element 533 is arranged on the observation optical axis L, and the reflected light (a parallel light flux) from the specimen A, which has exited the focusing unit 505 and entered the observing unit 532, enters the optical-path changing element 533. The reflected light from the specimen A is reflected by the optical-path changing element 533, enters the imaging lens 525, and is focused into an image on the imaging element 526. In this manner, the observing unit 532 and the focusing unit 505 are optically connected to each other by the parallel light flux.

The focusing unit 505 is moved along the observation optical axis L by the focusing-unit moving mechanism 510. The focusing unit 505 is moved independently of the observing unit 532.

The focusing operation of the microscope 530 is performed in the same manner as in the second embodiment. Since configurations of main parts of the microscope 530 are identical to those of the microscope 501 according to the second embodiment, the microscope 530 produces the same effect as the microscope 501 according to the second embodiment. Furthermore, as the microscope 530 has the optical-path changing element 533, the imaging element 526 and the imaging lens 525 are mounted to be aligned not in the vertical direction of the microscope 530 but in the front-back direction of the microscope 530, so the height of the entire microscope 530 can be reduced.

Figure 10:
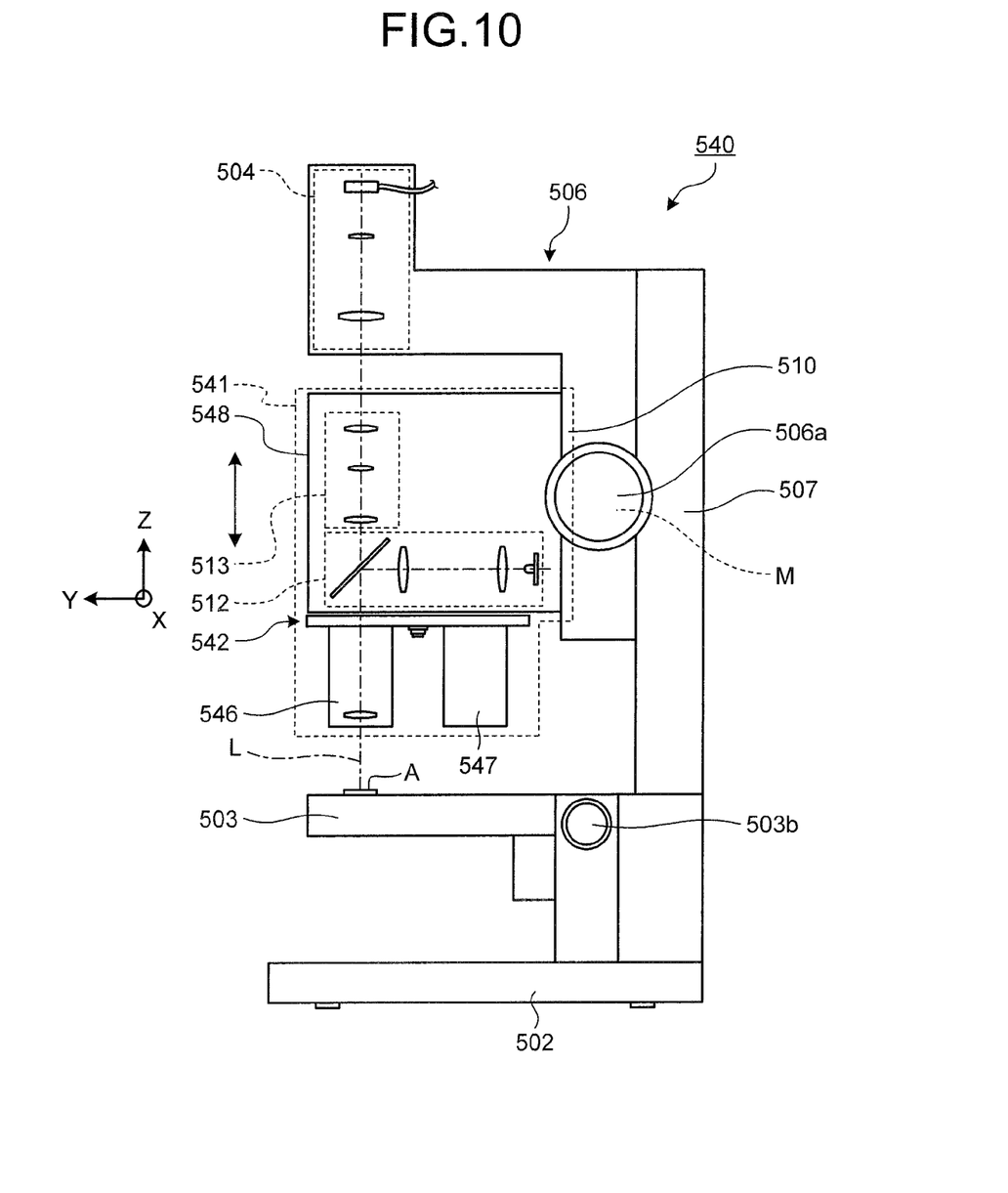
FIG. 10 is a side view illustrating a configuration of a microscope according to a fourth embodiment of the present invention.
Figure 11:
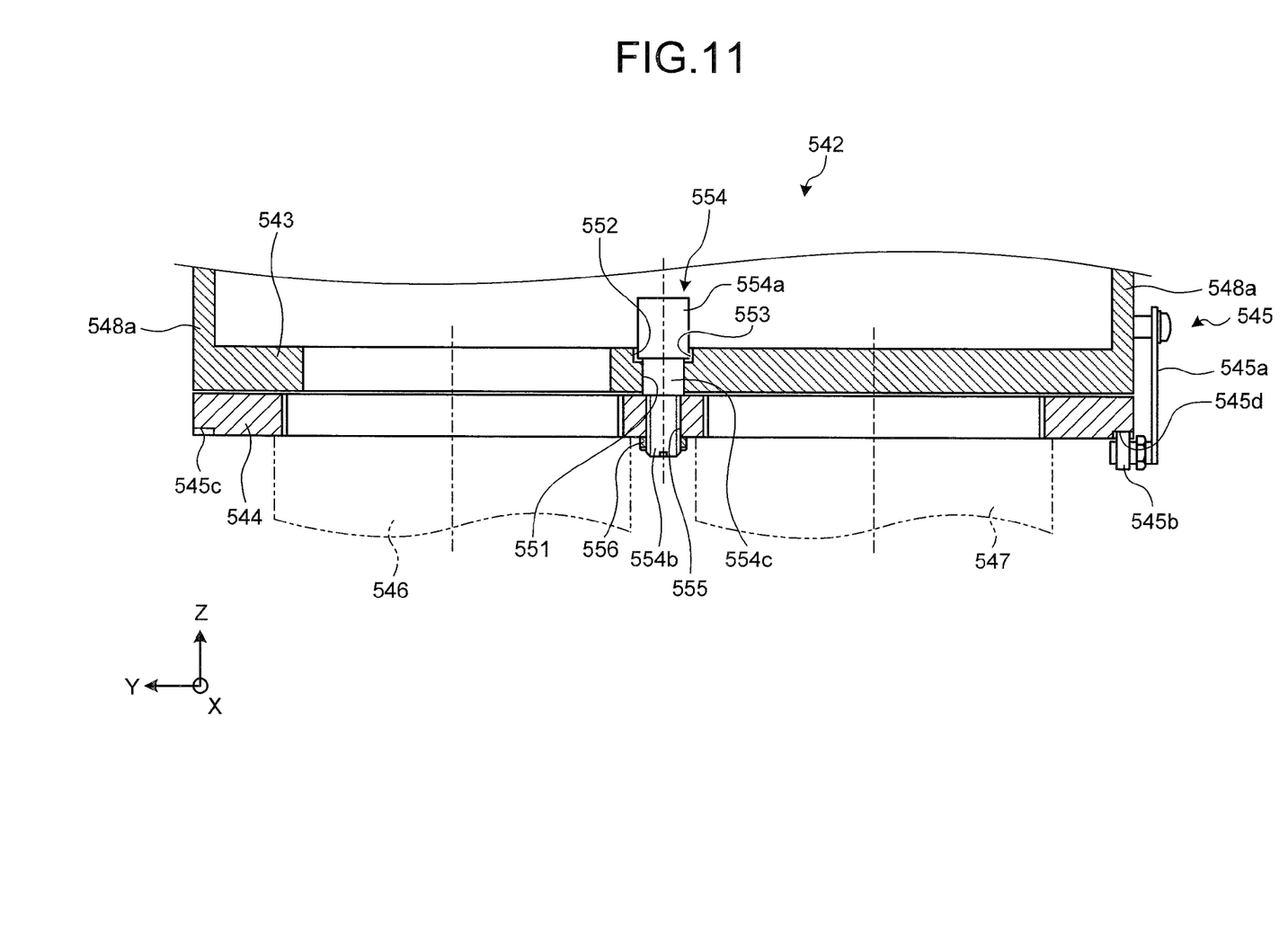
FIG. 11 is a sectional side view of a revolving nosepiece of the microscope according to the fourth embodiment.

FIG. 10 is a side view illustrating a microscope according to the fourth embodiment, and FIG. 11 is an enlarged view of a revolving nosepiece portion of the microscope. In what follows, portions identical to those explained in the second embodiment are denoted by the same reference numerals, and the description of the portions is omitted.

In a microscope 540 according to the fourth embodiment, a focusing unit 541 includes a revolving nosepiece 542. The focusing unit 541 is movably mounted on the front face of the focusing support unit 506 so that the focusing unit 541 can move up and down via the focusing-unit moving mechanism 510 with respect to the focusing support unit 506. The focusing unit 541 is moved along the observation optical axis L independently of the observing unit 504 by the focusing-unit moving mechanism 510. The focusing-unit moving mechanism 510 is a publicly-known mechanism, such as a mechanism with a rack and a pinion or a mechanism with a ball screw. The focusing unit 541 has an enclosure 548 formed into a box, and the illuminating unit 512 and the magnification converting unit 513 are provided in the enclosure 548. The enclosure 548 has a bottom plate and a side wall 548a standing around the bottom plate.

The revolving nosepiece 542 includes a supporting body 543, a revolving-nosepiece rotary member 544, a click mechanism 545, and objective lenses 546 and 547. The supporting body 543 is composed of the bottom plate of the enclosure 548, which is formed into a substantially flat plate, and a through-hole 551 is formed on the center part of the supporting body 543. On the upper part of the through-hole 551, a spot-faced portion 552 is formed. The spot-faced portion 552 is formed so that the upper part of the through-hole 551 is opened wider than the other part and the opening of the through-hole 551 is circumferentially stepped. On the spot-faced portion 552, a ring-shaped friction reducing member 553 is provided.

The revolving-nosepiece rotary member 544 is formed into a plate, and a through-hole 555 is formed on the center of the revolving-nosepiece rotary member 544. The revolving-nosepiece rotary member 544 has a rotating shaft 554, which is the central axis of rotation of the revolving-nosepiece rotary member 544. The rotating shaft 554 is formed into a rod, and one end of the rotating shaft 554 in a length direction is a head portion 554a, the other end is a screw portion 554b, and a portion between the head portion 554a and the screw portion 554b is a body portion 554c. The head portion 554a is formed to be thicker than the body portion 554c, and the body portion 554c is formed to be thicker than the screw portion 554b. The screw portion 554b is formed into a screw by screw thread cutting.

The screw portion 554b is fitted into the through-hole 555 of the revolving-nosepiece rotary member 544. A tip of the screw portion 554b projects downward from the through-hole 555, a projecting portion of the screw portion 554b is fastened by a nut 556. The rotating shaft 554 is fixed to the revolving-nosepiece rotary member 544 so that the revolving-nosepiece rotary member 544 is held by a circular bottom surface of the body portion 554c of the rotating shaft 554 and the nut 556.

The body portion 554c of the rotating shaft 554 is fitted into the through-hole 551 of the supporting body 543, and the head portion 554a projects upward from the supporting body 543. A circular bottom surface of the head portion 554a is in contact with the spot-faced portion 552 and supported by the supporting body 543.

In this manner, the revolving-nosepiece rotary member 544 is rotatably supported by the supporting body 543. The objective lenses 546 and 547 of different magnifications from each other, which are arranged across the rotating shaft 554, are removably mounted on the revolving-nosepiece rotary member 544 with screws. By rotating the revolving-nosepiece rotary member 544, any of the objective lenses 546 and 547 to be arranged on the observation optical axis L can be switched.

The click mechanism 545 is composed of a leaf spring 545a, a bearing 545b, and click grooves 545c and 545d. The one end side of the leaf spring 545a is fixed to the lower part of the side wall 548a, and the other end side is provided with the bearing 545b. The bearing 545b is formed in a cylindrical shape, and rotatably supported by the leaf spring 545a. The click grooves 545c and 545d are formed to be located at the periphery of the undersurface of the revolving-nosepiece rotary member 544, and each formed in the shape of a groove into which the bearing 545b falls. When the revolving-nosepiece rotary member 544 is rotated, the bearing 545b falls into the click groove 545c or the click groove 545d, thereby positioning the objective lenses 546 and 547. The click groove 545c corresponds to the objective lens 547, and the click groove 545d corresponds to the objective lens 546. Namely, in a case where the objective lens 546 is used for observation, when the objective lens 546 is arranged on the observation optical axis L, the bearing 545b falls into the click groove 545d. On the other hand, in a case where the objective lens 547 is used for observation, when the objective lens 547 is arranged on the observation optical axis L, the bearing 545b falls into the click groove 545c, thereby positioning the objective lens.

The operation for switching between the objective lenses 546 and 547 is explained. To switch to the objective lens 547 in a state where the objective lens 546 is arranged on the observation optical axis L, the objective lens 546 is held and slowly rotated around the rotating shaft 554 by 180 degrees. As a result, the bearing 545b comes out from the click groove 545d, and the bearing 545b then falls into the other click groove 545c. In this way, switching between the objective lenses 546 and 547 is made. The focusing operation is performed in the same manner as in the second embodiment.

Since configurations of main parts of the microscope 540 are identical to those of the microscope 501 according to the second embodiment, the microscope 540 produces the same effect as the microscope 501 according to the second embodiment. Furthermore, as the microscope 540 includes the revolving nosepiece 542, an operator can switch to an objective lens to be used without removing a previously-used objective lens to replacing it to the objective lens to be used, so the work burden can be reduced. Other publicly-known means with a bearing can be used as the rotation mechanism of the revolving nosepiece.

In the second to fourth embodiments described above, the imaging element is mounted as an observing means in the observing unit; alternatively, an eyepiece for making a visual observation can be mounted as the observing means. Furthermore, as the observing means, both the imaging element and the eyepiece can be mounted so as to switch between the monitor observation and the visual observation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
    an objective lens;
    an imaging unit that has an imaging lens for forming an observation image of a specimen, and an imaging element for taking the observation image, the imaging lens and the imaging element being arranged on an observation optical axis, and the imaging unit being optically connected to the objective lens by a parallel light flux;
    a supporting unit that fixedly supports the imaging unit, and movably supports the objective lens along the observation optical axis independently of the imaging unit; and
    an epi-illumination projecting unit that is supported by the supporting unit with a fixed, relative position with respect to the objective lens, moves together with movement of the objective lens along the observation optical axis, and lets illumination light fall on the objective lens.

2. The microscope according to claim 1, further comprising a rotary holding unit that holds the supporting unit so that the supporting unit can turn around a horizontal axis line.

3. The microscope according to claim 2, wherein the rotary holding unit holds a lower end of the supporting unit or near the lower end so that the supporting unit can turn.

4. The microscope according to claim 1, further comprising:
    a box-like enclosure that is movably supported by the supporting unit; and
    a magnification converting unit that has at least two zoom lenses arranged on the observation optical axis, and changes the observation magnification by moving any of the zoom lenses along the observation optical axis, wherein
    the epi-illumination projecting unit and the magnification converting unit are provided within the enclosure,
    the objective lens is mounted on the lower part of the enclosure, and
    the objective lens moves along the observation optical axis with movement of the enclosure.

5. The microscope according to claim 4, wherein
    the epi-illumination projecting unit reflects the illumination light to the side of the objective lens, and has an optical-path splitting element that lets observation light reflected from the specimen therethrough, and
    the optical-path splitting element is arranged on the observation optical axis between the magnification converting unit and the objective lens.

6. The microscope according to claim 4, further comprising a motor for generating power for movement of the enclosure.

7. The microscope according to claim 1, wherein the imaging unit has an optical-path changing element that changes an optical path of an observation light reflected from the specimen in a horizontal direction, and
    the imaging lens and the imaging element are arranged on an observation optical axis of the observation light of which the optical path is changed by the optical-path changing element.

8. The microscope according to claim 1, further comprising a revolving nosepiece that holds a plurality of objective lenses, and sets a desired objective lens out of the plurality of objective lenses on the observation optical axis, wherein
    the objective lens optically connected to the imaging unit is the objective lens set on the observation optical axis by the revolving nosepiece.

9. The microscope according to claim 1, wherein the imaging lens focuses a parallel light flux from the side of the objective lens.

* * * * *